United States Patent
Scherpf et al.

(10) Patent No.: US 6,235,330 B1
(45) Date of Patent: May 22, 2001

(54) PROCESS FOR MAKING FREE-FLOWING, COATED, FROZEN FOOD

(75) Inventors: David H. Scherpf; David Patterson; Steven W. Kirkvold; Andrew Hampton, all of Omaha, NE (US)

(73) Assignee: Conagra, Inc., Omaha, NV (US)

( * ) Notice: Subject to any disclaimer, the term of this patent is extended or adjusted under 35 U.S.C. 154(b) by 0 days.

(21) Appl. No.: 09/156,472

(22) Filed: Sep. 18, 1998

(51) Int. Cl.[7] ................................................ A23P 1/08
(52) U.S. Cl. ........................ 426/302; 426/89; 426/100; 426/102; 426/303; 426/304; 426/305; 426/497; 426/524
(58) Field of Search .................. 426/89, 100, 102, 426/302, 304, 305, 497, 524, 303; 118/19

(56) References Cited

U.S. PATENT DOCUMENTS

| Re. 33,508 | 12/1990 | Kielsmeier et al. | 426/582 |
|---|---|---|---|
| 3,300,993 | 1/1967 | Schlemmer | 62/63 |
| 3,368,366 | 2/1968 | Keeling | 62/374 |
| 3,607,313 * | 9/1971 | Roth | 426/302 |
| 3,868,470 * | 2/1975 | Fallon et al. | 426/302 |
| 4,142,001 * | 2/1979 | Kilpatrick | 426/302 |
| 4,487,786 * | 12/1984 | Junge | 426/302 |
| 5,223,293 | 6/1993 | Bain | 426/305 |
| 5,911,827 * | 6/1999 | Heller | 118/19 |
| 6,007,859 * | 12/1999 | Taylor et al. | 426/302 |

FOREIGN PATENT DOCUMENTS

| 4141448 * | 6/1993 | (DE) . |
|---|---|---|
| 0 093 506 B1 | 12/1986 | (EP) . |
| 0 332 287 B1 | 7/1992 | (EP) . |
| 0531743 * | 3/1993 | (EP) . |
| 0 294 018 B1 | 5/1993 | (EP) . |
| 0560509 * | 9/1993 | (EP) . |
| 0 372 354 B1 | 11/1993 | (EP) . |
| 0 519 578 B1 | 12/1993 | (EP) . |
| 0 519 579 B1 | 12/1993 | (EP) . |
| 0 617 248 B1 | 9/1994 | (EP) . |
| 0 472 450 B1 | 12/1995 | (EP) . |
| 0923883 * | 6/1999 | (EP) . |
| 0857430 * | 8/1999 | (EP) . |
| 0960575 * | 12/1999 | (EP) . |
| 1032225 | 6/1966 | (GB) . |
| 1 327 422 | 8/1973 | (GB) . |
| 2 023 789 | 12/1982 | (GB) . |
| 2284136 * | 5/1995 | (GB) . |
| 95/20324 | 8/1995 | (WO) . |
| 00/16645 * | 3/2000 | (WO) . |

* cited by examiner

Primary Examiner—Milton Cano
(74) Attorney, Agent, or Firm—Christie, Parker & Hale, LLP

(57) ABSTRACT

A free-flowing, coated, frozen food and a method for making the same are disclosed. Discrete pieces of a free-flowing frozen food are introduced into a coating vessel where they are agitated to expose their surfaces and to maintain their free-flowing state throughout the coating process. A liquid coating material is sprayed onto the free-flowing pieces to cause coating material to adhere and the temperature at the surfaces of the frozen food pieces to rise. The surfaces of frozen food pieces are then recooled with a cryogen. The spraying and recooling steps are repeated until a thorough, even coating is built up on the discrete pieces of free-flowing food.

35 Claims, 3 Drawing Sheets

PROCESS FOR MAKING FREE-FLOWING, COATED, FROZEN FOOD

BACKGROUND OF THE INVENTION

1. Field of Invention

This invention relates to food products. In particular, it relates to coated, frozen foods and to a method for making the same.

2. Discussion of the Related Art

Among the most popular prepared foods are precooked, frozen foods. Particularly well liked are foods such as pasta, potatoes, and vegetables that are individually quick frozen ("IQF"). Such simple, IQF foods provide the convenience of being free-flowing. Consumers appreciate the flexibility of choosing the quantity of frozen food to be cooked at a particular time. In contrast to such simple foods, when conventional processes are used to prepare precooked, frozen food products that include sauces or toppings, the resulting combination is generally in the form of a single, agglomerated mass that cannot be easily divided.

Consequently, there is a desire to extend the range of IQF foods to include free-flowing foods coated with sauces, toppings, and the like. For example, in addition to plain, IQF pasta without any sauce or an agglomerated chunk of pasta frozen with sauce, it would be desirable to have free-flowing IQF pasta already coated with the right amount of sauce. Similarly, in addition to plain IQF frozen vegetables, or a frozen clump of vegetables in a sauce, it would be desirable to have a free-flowing mixture of IQF vegetables already coated with the right amount of sauce. There are numerous problems to overcome when trying to coat IQF food with a sauce or topping to produce a free-flowing mixture. For example, to meet consumer expectations for a food that has the appearance and texture of a home-cooked food, a precooked, frozen food must have a sauce that clings to or forms a coating on the surface of the underlying food. It has, however, proved difficult to provide a coating that clings to IQF foods, but does not result in a single, frozen mass.

Thus, there remains a definite need for IQF products having sauces, toppings, and the like that can be reheated to produce foods having the appearance and texture of their home-cooked counterparts. There remains a further definite need for a simple and effective method for preparing such free-flowing IQF food products. The present invention satisfies these and other needs and provides further related advantages.

SUMMARY OF THE INVENTION

The present invention provides individual bits of a free-flowing, coated, frozen food, such as a coated, individually quick frozen ("IQF") pasta, rice, potato, vegetable, fruit, meat, seafood, simulated-egg product or mixture thereof, as well as a process for making such a free-flowing, coated, frozen food. In a preferred embodiment, the IQF food is pasta. And in some preferred embodiments, the pasta is coated with from about 0.1% to about 5% fatty material, such as soybean oil, corn oil, olive oil, cotton seed oil, butter, cream or margarine, based on the weight of the coated pasta, prior to being individually quick frozen.

Discrete pieces of an IQF food are loaded into a coating vessel. In some embodiments, the frozen food pieces initially have a temperature less than about 10° F., preferably less than about 0° F. In a preferred embodiment, the temperature of the frozen food pieces is then reduced to less than about −25° F. by introducing a flow of cryogen into the coating vessel. Representative cryogens include subliming carbon dioxide and liquid nitrogen.

While in the coating vessel, the frozen food pieces are tumbled or otherwise agitated so as to expose the surfaces of the free-flowing pieces and to maintain the pieces in a free-flowing state. The exposed surfaces are sprayed with a liquid coating material through a manifold opening into the coating vessel causing the liquid coating material to adhere to the exposed surfaces of the frozen food pieces. In some embodiments, the pressure at the manifold inlet is from about 0 psig to about 100 psig, and in some embodiments the pressure is from about 20 psig to about 60 psig. The temperature of the liquid coating material is typically from about 40° to 180° F., preferably from about 60° to 70° F. Thus, when the liquid coating material adheres to the surface of the frozen food IQF pieces, it causes the temperature of the pieces to rise.

Cryogen is then introduced into the coating vessel to recool the free-flowing pieces, in some embodiments to a temperature less than about 0° F., and in some embodiments to a temperature less than about 20° F. and in some other embodiments to a temperature less than about −35° F. In a preferred embodiment, the spray of liquid coating material is stopped before the flow of cryogen is introduced. Also, in some embodiments, the flow rate of the cryogen is controlled as it enters the coating vessel, so that the exhausted cryogen has a temperature of from about 0° to about −100° F. as it exits the coating vessel.

After the frozen food pieces have been recooled, the process is repeated. More liquid coating material is sprayed onto the exposed surface of the free-flowing IQF pieces and adheres to the recooled surfaces. In a preferred embodiment, the flow of cryogen is stopped, before resuming spraying the liquid coating material. The spraying and recooling steps are repeated over and over, until a thick, even coating is built up on the pieces of IQF food.

The resulting coating preferably weighs in the range of from about 5 wt. % to about 75 wt. %, more preferably in the range of from about 40 wt. % to about 75 wt. %, based on the total weight of the coated food. In some embodiments, once the free-flowing, coated, frozen food is produced, it is blended with discrete pieces of at least one additional food.

DESCRIPTION OF THE PREFERRED EMBODIMENTS

Particular embodiments of the invention are described below in some detail for the purpose of illustrating its principles and operation. However, various modifications may be made, and the scope of the invention is not limited to the exemplary embodiments described below.

Accordingly, while specific reference is made to the preparation of a coated, frozen pasta, it can be appreciated that aspects of the invention may be applied to the preparation of coated frozen foods from almost any individually quick frozen ("IQF") food. For example, a method in accordance with the invention can be used to coat pieces of food as small as rice, as well as pieces of potatoes, vegetables, fruits, meats, and simulated-egg products ranging in size up to about 3 inches in all directions and greater. Furthermore, aspects of the inventive process can be used to coat IQF food with a wide variety of edible liquids, such as dairy sauces, cocktail sauce, and teriyaki sauce, fruit and vegetable glazes, and flavored coatings for tacos, burritos and the like.

Figure 1:
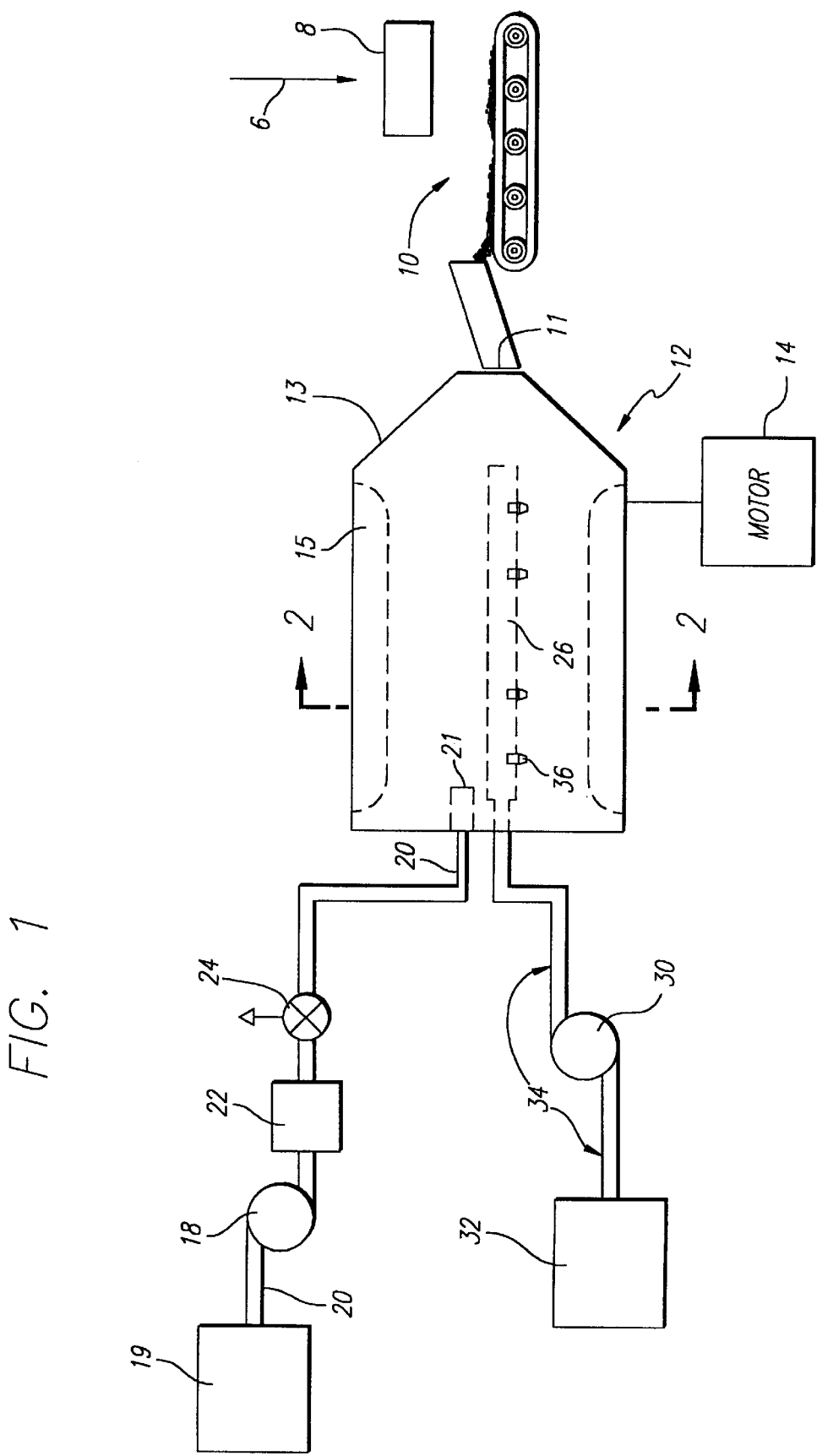
FIG. 1 is a schematic depiction of a coating-apparatus, including a rotatable drum, and related equipment useful in a batch process in accordance with the inventive method, with the interior components of the drum being shown in phantom.

As shown schematically in FIG. 1, a feed line 6 transports pasta to be coated to an IQF unit 8. From this point forward, the pasta pieces remain in the frozen condition, as discrete pieces. It is an advantage of the inventive process that even after subsequent coating, the frozen food remains substantially discrete and free-flowing.

Once individually quick frozen, a predetermined weight of the IQF pieces is introduced by an IQF transport 10 into the open end 11 of a coating vessel 12 formed of a horizontally-oriented coating drum 13, rotatable about its longitudinal horizontal axis under the force of an electric motor 14. The rotatable drum has blade-like baffles 15 which extend the length of the drum. In some embodiments, the blades are angled, while in other embodiments, the blades form a spiral extending radially from its interior surface. Depending on the orientation of the blades, the IQF pieces can be caused to move in either longitudinal direction or caused to have essentially no longitudinal movement at all. Because the pieces are kept in constant motion or agitation, they do not agglomerate, but remain free-flowing throughout the entire coating process. Suitable rotatable, coating vessels that can be adapted to practice the inventive process are available from Blentech Corp., Santa Rosa, Calif. and Robert Reiser & Co., Canton, Mass.

The interior of the drum 13 is equipped with a liquid manifold 26. In the embodiment shown in FIG. 1, the manifold is a spray bar extending along a substantial portion of the horizontal axis of rotation of the drum. A first displacement pump 30 provides a predetermined amount of a pressurized liquid coating material, either continuously or intermittently, from a liquid coating material supply tank 32 through liquid coating material conduit 34 and into the liquid manifold, at a rate governed by control valve 31.

Figure 2:
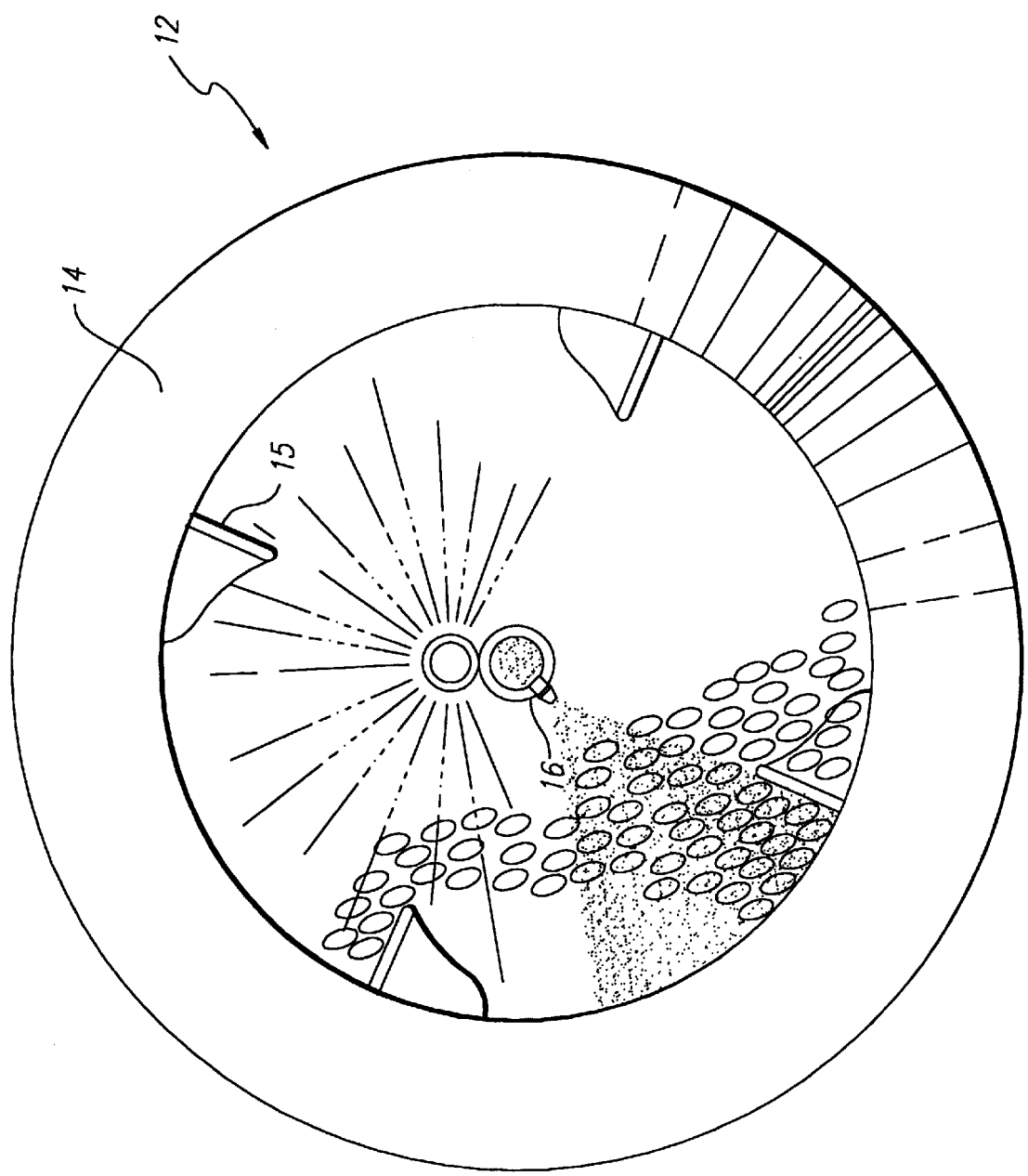
FIG. 2 is a cross-sectional view taken along the line 2—2 of FIG. 1.

Referring additionally to FIG. 2, multiple, liquid spray nozzles 36 evenly spaced along the manifold 26, near the center of the drum 13 are outwardly, radially oriented. Suitable nozzles are available from Spraying Systems Co. and include their VeeJet (standard, flat fan) and Teejet (high impact, flat fan) models. As best seen if FIG. 2, the liquid spray nozzles are directed at an angle of from about zero to about ninety degrees from straight down (with the drum turning clockwise direction). These nozzles typically have orifices with diameters of from about 0.1 to about 0.25 inches. Orifices with diameters up to about 0.50 inches or larger can be employed when the liquid coating material includes at least one solid ingredient in suspension. The orifices are configured to create any suitable spray pattern, such as a straight jet, full cone or, preferably, a flat fan pattern.

A second displacement pump 18 provides a controlled amount of a cryogen, such as subliming carbon dioxide or liquid nitrogen, from a cryogen supply tank 19 through a cryogen conduit 20 and to a cryogen applicator 21. Depending on the cryogen chosen, it may be introduced into the drum 13 continuously or intermittently. In the embodiment shown in FIG. 1, the cryogen is subliming carbon dioxide and it is continuously introduced into the vessel through a nozzle and horn assembly. The flow rate of the carbon dioxide through the conduit and into the drum 13 is measured by a flow meter 22 and governed by a control valve 24, so that the exhausted cryogen has a temperature of preferably from about 0 to about $-100°$ F., as it exits the coating vessel.

The inventive method is especially useful in preparing pasta coated with a thick sauce, such as a tomato, Alfredo or cheese sauce. The pasta can be either fresh, extruded or dry, cooked pasta and the pasta products that can be advantageously prepared in accordance with the inventive process include ravioli, tortellini, rigatoni, macaroni, and the like. If fresh pasta is used, it is first extruded into a desired shape, then cooked by blanching. To prevent overcooking, the pasta is next chilled by rinsing in cold water. In some embodiments, an intermediate coating of a solid or liquid, food-acceptable, fatty material is applied to the cooked pasta, before the pasta is frozen. The fatty material can be saturated or unsaturated and can be, for example, soybean oil, corn oil, olive oil, cotton seed oil, butter, cream or margarine. The amount of fatty material coated on the cooked pasta is typically from about 0.1 to about 5% and, preferably, from about 0.5 to about 3%, based on the weight of the thus coated pasta.

The cooked pasta is then individually quick frozen, generally, to temperatures of less than about $10°$ F., preferably less than about $0°$ F. Techniques for individually quick freezing foods are known in the art. The conditions for individually quick freezing the pieces of a particular food item to be subsequently frozen will depend on the characteristics of the food item, including its size, shape, density, flowability, and the like. The optimum conditions for quick freezing a particular food item will be readily determinable by one skilled in the art without undue experimentation. Some foods are coated immediately after freezing. Other foods are maintained in a frozen state, e.g., at temperatures less than about $10°$ F., preferably less than about $0°$ F., for a predetermined period, before coating.

The IQF pasta is then loaded into the coating vessel 12, typically at a temperature of less than about $10°$ F., preferably at a temperature of less than about $0°$ F. In a preferred embodiment, cryogen is then introduced into the drum 13 to further cool the frozen pieces of pasta, preferably to a temperature less than about $-25°$ F. Any cryogen suitable for use with food can be used, with normally gaseous substances being preferred. Suitable cryogens include liquid carbon dioxide (which forms a subliming snow at atmospheric pressure) and liquid nitrogen.

The rotation of the coating drum 13, along with the baffles 15, agitate the pieces of frozen food and control the tumbling action of the food throughout the coating process. To ensure an even application of the liquid coating material and the creation of an even coating, and to ensure that the coated pieces remain free flowing, the drum is preferably rotated at a speed of from about 5 to about 20 rpm, while liquid coating material is applied and the coating is being formed.

As best seen in FIG. 2, as the drum 13 rotates, the baffles 15 cause the frozen pieces to be carried from the bottom of the drum upwardly along one side of the drum, until gravity causes the pieces to fall back to the bottom of the drum. The height to which the pieces are lifted depends on the angular velocity (rotational speed) of the drum. The pieces are then projected outward from the side of the drum and fall back to the bottom of the drum, forming a nearly continuous cascading curtain of food pieces. This lifting and falling process is repeated continuously until the coating process is complete.

The inventive process can be used to coat pasta with a wide variety of edible liquid coating materials, including tomato sauce, cheese sauce, and Alfredo sauce. The liquid coating material may contain one or more solid ingredients in suspension. Illustrative solid ingredients for use in a sauce for pasta include basil, garlic, and black pepper. The temperature at which the liquid coating material is applied is preferably from about 40° to 180° F, more preferably from about 60° to 70° F. The liquid coating material spray is controlled by the flow rate and the pressure at which the liquid coating material is pumped, as well as the nozzle type, size, and configuration. The flow rate and pressure will depend on the characteristics of the liquid coating material, e.g., its viscosity, and on the characteristics of the frozen food to be coated, e.g., its size and shape, as well as the size and type of the coating vessel. The particular flow rate and pressure to be used for a desired combination of liquid coating material and frozen food will be readily determinable by one skilled in the art without undue experimentation. In a preferred embodiment, the pressure at the manifold inlet is from about 0 psig to about 100 psig, more preferably of from about 20 psig to about 60 psig. The liquid coating material can be applied continuously or, as in preferred embodiments, intermittently.

The nozzles are aimed so that the liquid coating material is sprayed directly onto the exposed surfaces of the pieces of frozen food as the pieces fall downwardly from the side of the drum 13 to the bottom of the drum. As the liquid coating material adheres to the exposed surfaces, it causes the temperature at the surfaces to rise, e.g., up to as high as 10° F.

Sufficient cryogen is introduced into the vessel 12 to recool the free-flowing pieces. In a preferred embodiment, the spray of liquid coating material is stopped before, the flow of cryogen introduced.

After the IQF pasta pieces have been recooled, the process is repeated. More liquid coating material is sprayed onto and adheres to the exposed surfaces of the recooled, free-flowing pieces. In a preferred embodiment, the flow of cryogen is stopped, before resuming spraying of the liquid coating material. This added coating material is then cooled by additional cryogen. In some embodiments, the food pieces are recooled to a temperature of less than about 0° F. by at least one of the recooling steps; while in some embodiments, the food pieces are recooled to a temperature of less than about –20° F by at least one of the recooling steps; and, in some embodiments, the food pieces are recooled to a temperature of less than about –35° F. by at least one of the recooling steps.

The effectiveness of the cryogen can be measured by monitoring the temperature of the cryogen as it exits from the coating vessel. It has been found that when the cryogen is effective, the exiting gas has a temperature of from about 0° to about –100° F. The spraying and recooling steps are repeated, until a thick, even coating is built up on the pieces of IQF food.

By using the method in accordance with the invention, it is possible to prepare free-flowing, individually coated pieces of IQF foods. The coatings preferably weigh in the range of from about 5 wt. % to about 75 wt. % and more preferably in the range of from about 40 wt. % to about 75 wt. %, based on the total weight of the coated food. The optimum design, which varies depending on the particular combination of IQF food and liquid coating material, is selected so that a thorough and even coating builds up on the exposed surfaces of the IQF pieces as the pieces repeatedly pass through the coating material. The thickness of the coating is controlled by pre-determining the number of times the coating/recooling/coating process is repeated. Uncoated and partially-coated product is exposed with every cycle of cascading to keep the sauce coating evenly distributed.

The thus coated, free-flowing, frozen pasta is unloaded from the coating vessel. The frozen food can be subsequently packaged. Alternatively, additional frozen ingredients, such as discrete pieces of frozen meats, vegetables or combinations of the two are mixed with the free-flowing, coated, frozen pieces, at temperatures less than about 10° F., preferably less than about 10° F., using a blender or tumbler.

Figure 3:
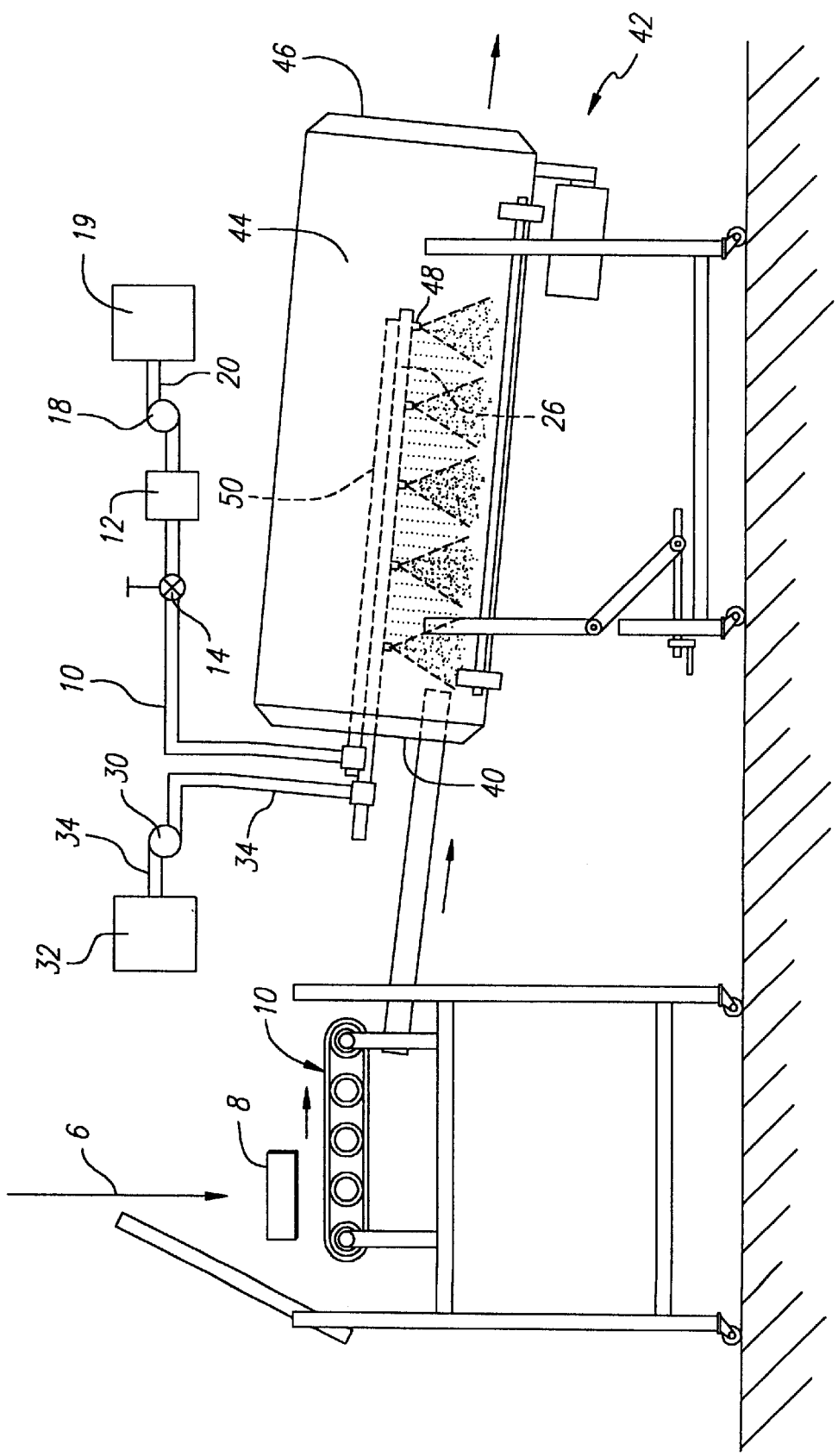
FIG. 3 is a schematic depiction of another embodiment of a coating-apparatus, including a pass-through coating vessel, and related equipment useful in a continuous process in accordance with the inventive method, with the interior components of the coating vessel being shown in phantom.

Turning to the embodiment shown in FIG. 3, like numbers in FIGS. 1 and 3 indicate like elements. Pasta is provided from a feed line 6 to an IQF unit 8. Once individually quick frozen, discrete pieces of frozen food are transported by a moving belt 10 and loaded through an open end 40, into a pass-through, cylindrical coating vessel 42 which rotates about an inclined longitudinal axis. Suitable pass-through vessels that can be modified to practice the inventive method include oil coating reels manufactured by Spray Dynamics. Pieces of frozen food are continuously moved through a rotating tube 44, and continuously discharged through the vessel outlet 46. As the pieces of frozen food travel the length of the reel, they are also caused to tumble by the rotating tube. A liquid coating material is applied to the surface of the thus agitated frozen food pieces by spray nozzles 48 that apply the liquid coating in a flat-fan pattern. A cryogen, liquid nitrogen in this embodiment, is intermittently introduced throughout the length of the vessel using a pipe header 50, with the result that a thorough, even coating is formed.

Other coated foods that can be prepared in accordance with the invention include pasta salads, glazed vegetables, potatoes au gratin and other potato and cheese sauce products, scrambled simulated-eggs coated with cheddar cheese, french toast sticks or mini-waffles coated with syrup, beef and vegetable stew, soups, chili, meat fillings for tacos, burritos, and the like, meatballs, beef stroganoff, casseroles, stir fry products, cocktail wieners coated with sauce, seafood coated with cocktail or other sauce, riblets coated with barbecue sauce, chicken wings coated with barbecue sauce, chicken tenders coated with teriyaki sauce, fruits coated with yogurt or other dairy coatings, fruit with glazed coatings, fruit cobblers, fruit with pound cake, and bananas foster to name a few.

The following examples are included to further illustrate the invention. They are not limitations thereon.

EXAMPLE 1

Rigatoni coated with a marinara sauce is prepared in accordance with the inventive process. The rigatoni is 2 inches long and 0.4 inches in diameter, with a wall thickness of 0.8 inches. It has a bulk density of 24.4 lb./ft$^3$, an outside surface area of 402 in$^2$/lb., and a weight of 0.63 lb./100 pieces. 123.75 lb. of IQF rigatoni is introduced into a Blentech Model VT1-0350 rotatable coating drum. An exemplary drum is 55 inches long and 46 inches in diameter. It is fitted with four nozzles spaced 4.25 inches from one another, at 26.75, 31, 35.25, and 39.5 inches from its open end. The drum rotates at a speed of 12 rpms. 185 lbs. of liquid nitrogen is introduced into the drum, intermittently, over a period of 23.1 minutes (277 turns). During this time, 101.25 lbs. sauce is intermittently applied over a total of 3.5 minutes (42 turns), with the period for each individual application of sauce increasing from 25 to 85 seconds. The total tumbling time is 29.8 minutes (358 turns). The resulting free-flowing product comprises 55% rigatoni and 45% sauce, by weight.

EXAMPLE 2

Rigatoni coated with an Alfredo sauce was prepared in accordance with the inventive process. 123.75 lb. of IQF rigatoni was introduced into a Blentech rotatable coating-drum fitted with a single nozzle. The drum rotated at a speed of 10 rpms.

A total of 145 lbs. of carbon dioxide was intermittently injected into the drum at a flow rate of 38.9 lb./min. and a pressure of 275 psig. Initially, the carbon dioxide was injected for 15 seconds to further cool the rigatoni. Thereafter, sauce having a temperature of 53° F. and carbon dioxide were alternately introduced into the drum. The sauce was injected for a period of 25 seconds, at a pressure of 15 psig. The carbon dioxide was then injected for 12 seconds. This cycle was repeated 16.4 times until 101.25 lbs. of sauce had been sprayed. After the last application of sauce, carbon dioxide was injected for 15 seconds to finally cool the coated product to a temperature less than −40° F. The resulting free-flowing product comprised 55% rigatoni and 45% sauce, by weight.

EXAMPLE 3

Rigatoni coated with an Alfredo sauce was prepared in accordance with the inventive process. 750 lb. of IQF rigatoni was introduced into a rotatable coating-drum manufactured by Peter Heller GmbH and fitted with four nozzles. The initial temperature of the rigatoni was 2° F. The drum rotated at a speed of 7.5 rpms.

A total of 1380 lbs. of carbon dioxide was intermittently injected into the drum at a flow rate of 58.1 lb./min. Initially, the carbon dioxide was injected for 2.3 minutes to further cool the rigatoni. Thereafter, sauce having a temperature of 70° F. and carbon dioxide were alternately introduced into the drum. The sauce was injected for a period of 2 seconds followed by a by a pause of 2 seconds for a total duration of 1.3 minutes, at a pressure of 24 psig. The carbon dioxide was then injected for 30 seconds, followed by a pause of 4 seconds for a duration of 2.3 minutes. This cycle was repeated 9.2 times until lbs. 675 of sauce had been sprayed. After the last application of sauce, average temperature of the coated product was about −20° F. The resulting free-flowing product comprised 55% rigatoni and 45% sauce, by weight.

The temperature of the (coated) pasta was calculated after each step of the coating process and the results are reported below.

| Cycle No. | Sauce | Carbon Dioxide |
|---|---|---|
|  |  | −28.8° F. |
| 1 | 2.3° F. | −25.8° F. |
| 2 | 2.6° F. | −23.5° F. |
| 3 | 2.9° F. | −21.4° F. |
| 4 | 3.1° F. | −19.6° F. |

-continued

| Cycle No. | Sauce | Carbon Dioxide |
|---|---|---|
| 5 | 3.3° F. | −18.1° F. |
| 6 | 3.5° F. | −16.7° F. |
| 7 | 3.6° F. | −15.4° F. |
| 8 | 3.8° F. | −14.3° F. |
| 9 | 3.9° F. | −13.3° F. |
| 10 | 4.0° F. | −12.4° F. |
| 10.2 | −9.0° F. | −21.0° F. |

While the invention has been described in detail with reference to certain preferred embodiments thereof, it will be understood that modifications and variations are within the spirit and scope of that which is described and claimed.

We claim:

1. A process for coating discrete pieces of a free-flowing, frozen food comprising the steps of:
   (a) loading discrete pieces of a free-flowing, frozen food in a coating vessel;
   (b) agitating the discrete frozen food pieces to expose their surfaces and to maintain the discrete pieces in a free-flowing state throughout a coating process;
   (c) spraying a liquid coating material onto the exposed surfaces of the free-flowing pieces to cause coating material to adhere to the surfaces and thereby to cause the temperature of the frozen food pieces to rise;
   (d) introducing a cryogen into the coating vessel to recool the frozen food pieces; and
   (e) repeating steps (c) and (d) until a thorough, even coating is built up on the discrete pieces of free-flowing, frozen food.

2. The process in accordance with claim 1, wherein the temperature of the frozen food is less than about −25° F. when it is first sprayed with the liquid coating material in step (c).

3. The process in accordance with claim 2, further comprising reducing the temperature of the frozen food pieces initially having a temperature greater than about 10° F. with the cryogen in the coating vessel before the frozen food pieces are sprayed with the liquid coating material in step (c).

4. The process in accordance with claim 2, further comprising reducing the temperature of the frozen food pieces initially having a temperature greater than about 0° F. with the cryogen in the coating vessel before the frozen food pieces are sprayed with the liquid coating material in step (c).

5. The process in accordance with claim 1, further comprising stopping the spraying in step (c), before the recooling with the cryogen in step (d).

6. The process in accordance with claim 1, further comprising stopping the recooling in step (d), before repeating step (c).

7. The process in accordance with claim 1, wherein the food pieces are recooled to a temperature of less than about 0° F. by at least one of the recooling steps (d).

8. The process in accordance with claim 1, wherein the food pieces are recooled to a temperature of less than about −20° F. by at least one of the recooling steps (d).

9. The process in accordance with claim 1, wherein the food pieces are recooled to a temperature of less than about −35° F. by at least one of the recooling steps (d).

10. The process in accordance with claim 1, wherein the frozen food is selected from the group consisting of pasta, rice, potatoes, vegetables, fruits, meats, seafood, simulated-eggs and mixtures thereof.

11. The process in accordance with claim 10, wherein the frozen food is pasta.

12. The process in accordance with claim 11, further comprising coating the pasta with from about 0.1 to about 5% fatty material, based on the weight of the coated pasta, prior to individually quick freezing the pasta.

13. The process in accordance with claim 12, wherein the pasta is coated with from about 0.5 to about 3% soybean oil, corn oil, olive oil, cotton seed oil, butter, cream, or margarine, prior to being individually quick frozen.

14. The process in accordance with claim 1, wherein the liquid coating material is sprayed at a pressure of from about 0 psig to about 100 psig.

15. The process in accordance with claim 14, wherein the liquid coating material is sprayed at a pressure of from about 20 psig to about 60 psig.

16. The process in accordance with claim 1, wherein the cryogen is carbon dioxide or nitrogen.

17. The process in accordance with claim 1, wherein the coating weighs in the range of from about 5 wt. % to about 75 wt. %, based on the weight of the coated food.

18. The process in accordance with claim 1, wherein the coating weighs in the range of from about 35 wt. % to about 65 wt. %, based on the weight of the coated food.

19. The process in accordance with claim 1, further comprising blending discrete pieces of an additional frozen food with the coated, frozen food.

20. The process in accordance with claim 19 wherein the additional frozen food is selected from the group consisting of meat, vegetables or combinations thereof.

21. The process in accordance with claim 1, wherein the process is a batch process.

22. The process in accordance with claim 21, wherein the coating vessel is a rotatable coating drum.

23. The process in accordance with claim 22, wherein the agitation is by rotating the coating drum at a speed of from about 5 to about 20 rpm.

24. The process in accordance with claim 1, wherein the process is a continuous process.

25. A process for coating discrete pieces of a free-flowing, frozen food comprising:
   (a) loading discrete pieces of an individually quick frozen food selected from the group consisting of pasta, rice, potatoes, vegetables, fruits, meats, seafood, simulated-eggs, and mixtures thereof into a coating vessel, the temperature of the individually quick frozen food being greater than about 0° F.;
   (b) introducing a flow of a cryogen selected from the group consisting of carbon dioxide and nitrogen into the coating vessel and reducing the temperature of the frozen food pieces to less than about −25° F.;
   (c) agitating the discrete frozen food pieces to expose their surfaces and to maintain the discrete pieces in a free-flowing state throughout a coating process;
   (d) spraying a liquid coating material onto the exposed surfaces of the free-flowing pieces to cause coating material to adhere to the surfaces and thereby to cause the temperature of the frozen food pieces to rise;
   (e) stopping the spray of liquid coating material and resuming the flow of cryogen into the coating vessel to recool the frozen food pieces with the cryogen; and
   (f) stopping the flow of the cryogen and then repeating steps (d) and (e) until a thorough, even coating weighing in the range of from about 5 wt. % to about 75 wt. %, based on the weight of the coated food, is built up on the discrete pieces of free-flowing food.

26. The process in accordance with claim 25, wherein the food pieces are recooled to a temperature of less than about 0° F. by at least one of the recooling steps (e) or (f).

27. The process in accordance with claim 25, wherein the food pieces are recooled to a temperature of less than about −20° F. by at least one of the recooling steps (e) or (f).

28. The process in accordance with claim 25, wherein the food pieces are recooled to a temperature of less than about −35° F. by at least one of the recooling steps (e) or (f).

29. The process in accordance with claim 25, wherein the frozen food is pasta.

30. The process in accordance with claim 25, wherein the coating weighs in the range of from about 35 wt. % to about 65 wt. %, based on the weight of the coated food.

31. The process in accordance with claim 25, wherein the process is a batch process.

32. The process in accordance with claim 25, wherein the coating vessel is a rotatable coating-drum and the frozen food pieces are agitated by rotating the coating-drum at a speed of from about 5 to about 20 rpm.

33. The process in accordance with claim 25, wherein the process is a continuous process.

34. The process in accordance with claim 25, further comprising blending discrete pieces of an additional frozen food with the coated, frozen food.

35. The process in accordance with claim 34 wherein the additional frozen food is selected from the group consisting of meat, vegetables or combinations thereof.

* * * * *

UNITED STATES PATENT AND TRADEMARK OFFICE
CERTIFICATE OF CORRECTION

PATENT NO. : 6,235,330 B1
DATED : May 22, 2001
INVENTOR(S) : David H. Scherpf et al.

It is certified that error appears in the above-identified patent and that said Letters Patent is hereby corrected as shown below:

<u>Title page,</u>
Item [56], References Cited, FOREIGN PATENT DOCUMENTS, replace "0 617 248 B1  9/1994 (EP)" with -- 0 617 248 A1  9/1994 (EP) --.

Signed and Sealed this

Ninth Day of September, 2003

JAMES E. ROGAN
*Director of the United States Patent and Trademark Office*